(12) United States Patent
Rudchenko et al.

(10) Patent No.: US 11,880,545 B2
(45) Date of Patent: Jan. 23, 2024

(54) DYNAMIC EYE-GAZE DWELL TIMES

(71) Applicant: Microsoft Technology Licensing, LLC, Redmond, WA (US)

(72) Inventors: Dmytro Rudchenko, Bellevue, WA (US); Eric N. Badger, Redmond, WA (US); Akhilesh Kaza, Sammamish, WA (US); Jacob Daniel Cohen, Seattle, WA (US); Peter John Ansell, Seattle, WA (US); Jonathan T. Campbell, Redmond, WA (US); Harish S. Kulkarni, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 8 days.

(21) Appl. No.: 17/357,107

(22) Filed: Jun. 24, 2021

(65) Prior Publication Data

US 2021/0318794 A1 Oct. 14, 2021

Related U.S. Application Data

(63) Continuation of application No. 15/840,477, filed on Dec. 13, 2017, now Pat. No. 11,079,899.

(60) Provisional application No. 62/537,432, filed on Jul. 26, 2017.

(51) Int. Cl.
*G06F 3/04817* (2022.01)
*G06F 3/01* (2006.01)
*G06F 3/0481* (2022.01)
*G06F 3/04886* (2022.01)
*G06F 40/274* (2020.01)
*G06N 20/00* (2019.01)

(52) U.S. Cl.
CPC .......... *G06F 3/04817* (2013.01); *G06F 3/013* (2013.01); *G06F 3/0481* (2013.01); *G06F 3/04886* (2013.01); *G06F 40/274* (2020.01); *G06N 20/00* (2019.01)

(58) Field of Classification Search
CPC .... G06F 3/04817; G06F 3/013; G06F 3/0481; G06F 3/04886
See application file for complete search history.

(56) References Cited

U.S. PATENT DOCUMENTS

| 8,571,851 | B1 * | 10/2013 | Tickner | G10L 15/1815 |
| | | | | 704/235 |
| 11,463,533 | B1 * | 10/2022 | Garber | H04L 67/1097 |
| 2008/0059521 | A1 * | 3/2008 | Hutson | G06F 16/954 |

(Continued)

*Primary Examiner* — Hope C Sheffield

(57) ABSTRACT

Systems and methods disclosed herein relate to assigning dynamic eye-gaze dwell-times. Dynamic dwell-times may be tailored to the individual user. For example, a dynamic dwell-time system may be configured to receive data from the user, such as the duration of time the user takes to execute certain actions within applications (e.g., read a word suggestion before actually selecting it). The dynamic dwell-time system may also prevent users from making unintended selections by providing different dwell times for different buttons. Specifically, on a user interface, longer dwell times may be established for the critical keys (e.g., "close" program key, "send" key, word suggestions, and the like) and shorter dwell times may be established for the less critical keys (e.g., individual character keys on a virtual keyboard, spacebar, backspace, and the like).

20 Claims, 11 Drawing Sheets

(56) References Cited

U.S. PATENT DOCUMENTS

| | | | |
|---|---|---|---|
| 2011/0175932 A1* | 7/2011 | Yu | G06F 3/04845 345/661 |
| 2014/0002341 A1* | 1/2014 | Nister | G06F 3/0237 345/156 |
| 2014/0049462 A1* | 2/2014 | Weinberger | G06F 3/013 345/156 |
| 2016/0011724 A1* | 1/2016 | Wheeler | G06F 3/013 715/810 |
| 2017/0038837 A1* | 2/2017 | Faaborg | G06F 3/011 |
| 2017/0153772 A1* | 6/2017 | Cox | G06F 3/013 |
| 2017/0169829 A1* | 6/2017 | Celikyilmaz | G06F 16/24522 |

* cited by examiner

DYNAMIC EYE-GAZE DWELL TIMES

CROSS-REFERENCE TO RELATED APPLICATIONS

This application is a continuation application of U.S. patent application Ser. No. 15/840,477, filed Dec. 13, 2017, which application claims the benefit of U.S. Provisional Application Ser. No. 62/537,432, filed on Jul. 26, 2017, the entire disclosure disclosures of which are hereby incorporated herein by reference.

BACKGROUND

Eye gaze or eye tracking is a way of accessing an electronic device or communication aid using an input device (e.g., a mouse) that is controlled by a user's eye or eyes. Eye-gaze interaction techniques may enable users to communicate and interact with electronic devices without the use of hands and fingers for typing. For example, users with certain motor disabilities may be able to communicate with eye-gaze technology. Currently, the primary technique used for gaze communication is eye-typing. To eye-type, a user looks at a letter on an on-screen keyboard. If the user's gaze remains fixed on the same letter for a set time period (the dwell-timeout), the system recognizes a user selection of that letter. Unfortunately, even the best eye-typing systems are relatively slow with reported entry rates ranging from 7-20 words per minute, with a plateau of roughly 23 words per minute. Such dwell-based eye-typing techniques may result in unsatisfactory delays and/or user fatigue.

Furthermore, having the same dwell time for each virtual key of a virtual keyboard, word suggestion, and other user interface (UI) element may lead to undesired consequences. For example, a word suggestion may accidentally be selected when the user was merely reading the word suggestion and not intending to select it. This leads to a poor user experience because the user may be forced to delete the accidentally inserted word and restart typing an intended word. A more consequential example may consist of a user who accidentally selects the "close" button (e.g., the "X" button) and loses unsaved work. Unfortunately, current solutions employ a fixed dwell time across all UI elements on a keyboard, including but not limited to virtual keys, word suggestions, or other UI elements (e.g., title bar or toolbar buttons such as close, minimize, and zoom buttons). Consistent dwell times may lead to a poor user experience and may increase the chances of errors and unintended actions.

It is with respect to these and other general considerations that example aspects, systems, and methods have been described. Also, although relatively specific problems have been discussed, it should be understood that the examples should not be limited to solving the specific problems identified in the background.

SUMMARY

Implementations described and claimed herein address the foregoing problems by providing dynamic eye-gaze dwell times. Not all UI elements are created equally, meaning that some UI elements require more cognitive load than other UI elements. For example, to select a word suggestion from a user interface, a user may need to take some time to read the word suggestion before selecting it. As such, selecting a word suggestion may require more cognitive load than selecting a single virtual key associated with a character from an on-screen keyboard. Because a word suggestion may require more cognitive load than a single character, a longer dwell time may be associated with word suggestions than single characters. In other example aspects, selecting title bar buttons, some toolbar buttons, function keys (e.g., keys that do not produce a character but cause something to happen within the application), and other special keys that more broadly affect an application, may generally require longer dwell times. For example, title bar buttons, some toolbar buttons, function keys, and other special keys may have significant consequences on an application, rather than just the input of characters or words. For example, accidentally selecting the "close" button in a word processing application may result in losing unsaved work. As such, critical keys, such as title bar buttons, function keys, and other special keys may be associated with longer dwell times than other keys.

Dynamic eye-gaze dwell times may be established according to predictive analysis and/or machine-learning algorithms. For example, a machine-learning algorithm may reference orthographic statistical models to establish dwell times for certain characters: if a user types a "Q" on the screen, then the letter "u" may have a shorter dwell time than the letter "z" because words that start with "Q" are statistically more often followed by the letter "u" than the letter "z." As such, a user who selects a "z" after selecting "Q" may experience longer dwell times before the system recognizes the letter "z" as selected in order to prevent an undesired character selection. In other example aspects, eye-gaze dwell times may be manually configured by the user.

The dynamic dwell-time system disclosed herein may provide a visual cue that assists the user in identifying the dynamic dwell-times associated with certain keys. When a user's gaze is mapped to a UI element, a visual rectangle may appear around that UI element. In some example aspects, after a user has fixated on a certain key for a certain duration of time, the rendered rectangle may initiate an animation (e.g., change colors, flash, graphics interchange format, etc.). During the animation time, the eye-gaze may be relocated to a different key to prevent the previously designated key from being selected. In further example aspects, certain UI elements may be accompanied by a visual cue that indicates each UI element's respective dwell-time. For example, the visual cue may be an outline. The outline may be presented around a certain UI element or a set of UI elements. In one example aspect, an outline may be presented around the keyboard letters, the spacebar, and the backspace button, while another outline may be around the other buttons and UI elements. The outline around the keyboard letters, spacebar, backspace button may indicate a shorter dwell time, while the other UI elements may indicate a longer dwell time, and vice-versa. In further example aspects, the outline visual may dynamically change after each letter is typed. As previously described, a user who enters a "Q" may experience a shorter dwell time when subsequently entering the letter "u" than the letter "z." In some example aspects related to the outline visual, after the user enters a "Q," the letter "u" may be supplemented by a colored outline that indicates a shorter dwell time, and the letter "z" may be supplemented with a different colored outline that indicates a longer dwell time.

In an aspect, a processor-implemented method for dynamic eye-gaze dwell times is disclosed herein. In an aspect, a processor-implemented method for dynamically determining dwell times for eye-gaze processing is provided. The method includes receiving a layout of a user interface, wherein the layout of the user interface comprises at least one UI element. The method further includes determining a first dwell time for the at least one UI element and receiving eye-gaze input on the user interface. Additionally, based on the eye-gaze input, the method includes determining a second dwell time for the at least one UI element.

In another aspect, a computing device including a processing unit and a memory storing processor-executable instructions is provided. The processor-executable instructions, when executed by the processing unit, cause the computing device to perform steps. The steps include receiving a layout of a user interface, where the layout of the user interface includes at least one UI element, and determining a first dwell time for the at least one UI element. The steps further include receiving eye-gaze input on the user interface and processing the eye-gaze input. Based on the processed eye-gaze input, the steps further include determining a second dwell time for the at least one UI element and updating at least one processing algorithm with one or more of: the processed eye-gaze input, the first dwell time and the second dwell time.

In yet another aspect, a processor-readable storage medium storing instructions that when executed by one or more processors of a computing device perform a method. The method is for analyzing eye-gaze input and includes receiving a layout of a user interface, where the layout of the user interface includes at least one UI element. The method further includes determining a first dwell time for the at least one UI element and receiving eye-gaze input on the user interface. Additionally, the method includes processing the eye-gaze input using at least one machine-learning algorithm and, based on the processed eye-gaze input, determining a second dwell time for the at least one UI element.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTIONS

Figure 1:
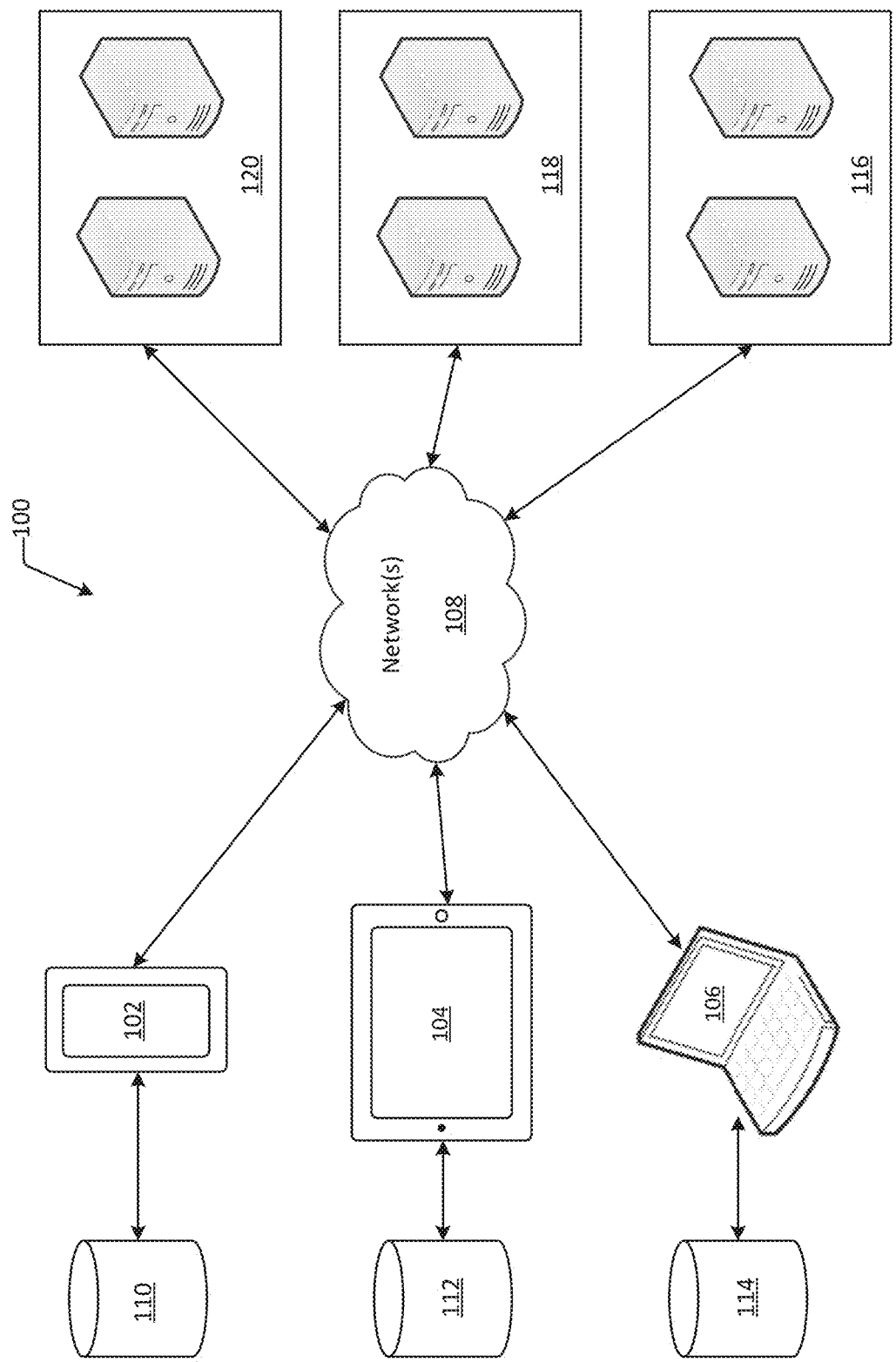
FIG. 1 illustrates an example of a distributed system for dynamically determining dwell times for eye-gaze processing.

In the following detailed description, reference is made to the accompanying drawings that form a part hereof, and in which are shown by way of illustrations or specific examples. These aspects may be combined, other aspects may be utilized, and structural changes may be made without departing from the present disclosure. Example aspects may be practiced as methods, systems, or devices. Accordingly, example aspects may take the form of a hardware implementation, a software implementation, or an implementation combining software and hardware aspects. The following detailed description is therefore not to be taken in a limiting sense, and the scope of the present disclosure is defined by the appended claims and their equivalents.

Implementations described and claimed herein describe example aspects of a dynamic dwell-time system. Dynamic dwell-times may be tailored to the individual user. The dynamic dwell-time system may be configured to receive data from the user, such as the duration of time the user takes to execute certain actions within applications (e.g., read a word suggestion before actually selecting it). In other example aspects, the dynamic dwell-time system may be configured to prevent users from making unintended selections. For example, by providing different dwell times for different buttons, a user may be able to avoid making unintended selections. Specifically, on a user interface, longer dwell times may be established for the critical keys (e.g., "close" program key, "send" key, word suggestions, and the like); and shorter dwell times may be established for the less critical keys (e.g., individual character keys on a virtual keyboard, spacebar, backspace, and the like).

In other example aspects, the dynamic dwell-time system disclosed herein may be applied to scenarios not involving a keyboard. Generally, the dynamic dwell-time system may be able to take specific actions for a user based on historical dwell-time data. For example, the dynamic dwell-time system may measure the time it takes for the user to read words by observing reading patterns on the device, e.g., by measuring the user's reading speed by repeatedly observing a time it takes for the user to perform reading tasks. Based on these measurements, the dynamic dwell-time system can estimate how long it will take the user to read a word and adjust dwell-time appropriately. For example, when a user is reading his/her email, the dynamic dwell-time system may detect that the user is reading and may compile statistics regarding per word time. The per word time can then be provided to the dynamic dwell-time system to adjust dwell time based on the known reading capabilities of the user. Thereafter, when the system detects that the user is spending a longer-than-normal amount of time on a certain word (e.g., based on the historical data), the dynamic dwell-time system may take corrective action. For example, the dynamic dwell-time system may zoom-in on the specific word taking a longer dwell-time, or the system may adjust the brightness or contrast of the screen to make it easier for the user to read the word. Other corrective actions may be taken by the dynamic dwell-time system to assist the user interfacing with an electronic device using eye-gaze.

In further example aspects, the dynamic dwell-time system may provide rapid mouse responses to the user. For example, if a user is navigating a webpage, the dynamic dwell-time system may be configured to have shorter dwell times for frequently clicked buttons, such as buttons that navigate the user within a page, or buttons that cause an animation or video to begin playing on the page. However, a user who desires to click on a hyperlink may find that the dwell-time to click the hyperlink and subsequently navigate to a different webpage is longer as compared to navigating within a current page, e.g., to view a text block that contains no buttons or links.

The dynamic dwell-time system disclosed herein may be implemented with an eye-tracker hardware device that is able to record a plurality of eye-gaze locations within milliseconds. Current eye-gaze typing solutions do not provide for dynamic dwell-times; as a result, users are prone to making more errors, some of which are hard to reverse (e.g., closing out of a program without saving, deleting full words and paragraphs, etc.). These unintended errors frustrate the user and are likely to increase the time to complete tasks, diminishing the user experience. Additionally, processing requirements to reverse or address actions performed in error are high. The present disclosure overcomes these deficiencies by implementing a dynamic dwell-time system that configures dwell-times according to the user's behavior, historical eye-typing patterns, and criticalness of user interface elements. As such, the present disclosure may improve user experience by reducing the time to complete tasks and the number of unintended user errors.

FIG. 1 illustrates an example of a distributed system for dynamically determining dwell times for eye-gaze processing.

A system implementing a dynamic dwell-time system may be executed on electronic devices including but not limited to client devices such as mobile phone 102, tablet 104, and/or a personal computer 106. The disclosed system may receive eye gaze input data while running an application, including but not limited to a text messaging application, an electronic mail application, a search engine application, and any other application that has a text input option, such as any web browser application. The disclosed system may also receive a user interface layout, including but not limited to the layout of a virtual keyboard or a webpage and the actions associated with certain buttons. The disclosed system may then process the eye gaze input and the UI layout locally, remotely, or using a combination of both. During processing, the disclosed system may rely on local and/or remote databases to generate dynamic dwell-times for each UI element, which may be customized according to the historical behavior and/or preferences of the user. This may be accomplished by utilizing local data (e.g., local datasets 110, 112, 114) stored in a local database associated with client devices 102, 104, 106 and/or remote databases stored on or associated with servers 116, 118, 120, or a combination of both.

For example, mobile phone 102 may utilize local dataset 110 and access servers 116, 118 and/or 120 via network(s) 108 to process the eye-gaze input data and UI layout data and establish appropriate dwell-times for certain UI elements back to the user. In other example aspects, tablet 104 may utilize local database 112 and network(s) 108 to synchronize the relevant tokens and features extracted from the processed eye-gaze input data and the subsequent customized dwell-times that are provided back to the user across client devices and across all servers running the dynamic dwell-time system. For example, if the initial eye-gaze input and UI layout data is received on tablet 104, the eye-gaze input data, UI layout data, and subsequent dynamic dwell-times may be saved locally in database 112, but also shared with client devices 102, 106 and/or servers 116, 118, 120 via the network(s) 108.

In other example aspects, the dynamic dwell-time system may be deployed locally. For instance, if the system servers 116, 118, and 120 are unavailable (e.g., due to network 108 being unavailable or otherwise), the dynamic dwell-time system may still operate on a client device, such as mobile device 102, tablet 104, and/or computer 106. In this case, a subset of the trained dataset applicable to the client device type (e.g., mobile device, tablet, laptop, personal computer, etc.) and at least a client version of the machine-learning algorithms may be locally cached so as to automatically respond to relevant tokens and features extracted from eye-gaze input data and UI layout data on the client device. The system servers 116, 118, and 120 may be unavailable by user selection (e.g., intentional offline usage) or for a variety of other reasons, including but not limited to power outages, network failures, operating system failures, program failures, misconfigurations, hardware deterioration, and the like.

As should be appreciated, the various methods, devices, components, etc., described with respect to FIG. 1 are not intended to limit system 100 to being performed by the particular components described. Accordingly, additional topology configurations may be used to practice the methods and systems herein and/or components described may be excluded without departing from the methods and systems disclosed herein.

Figure 2:
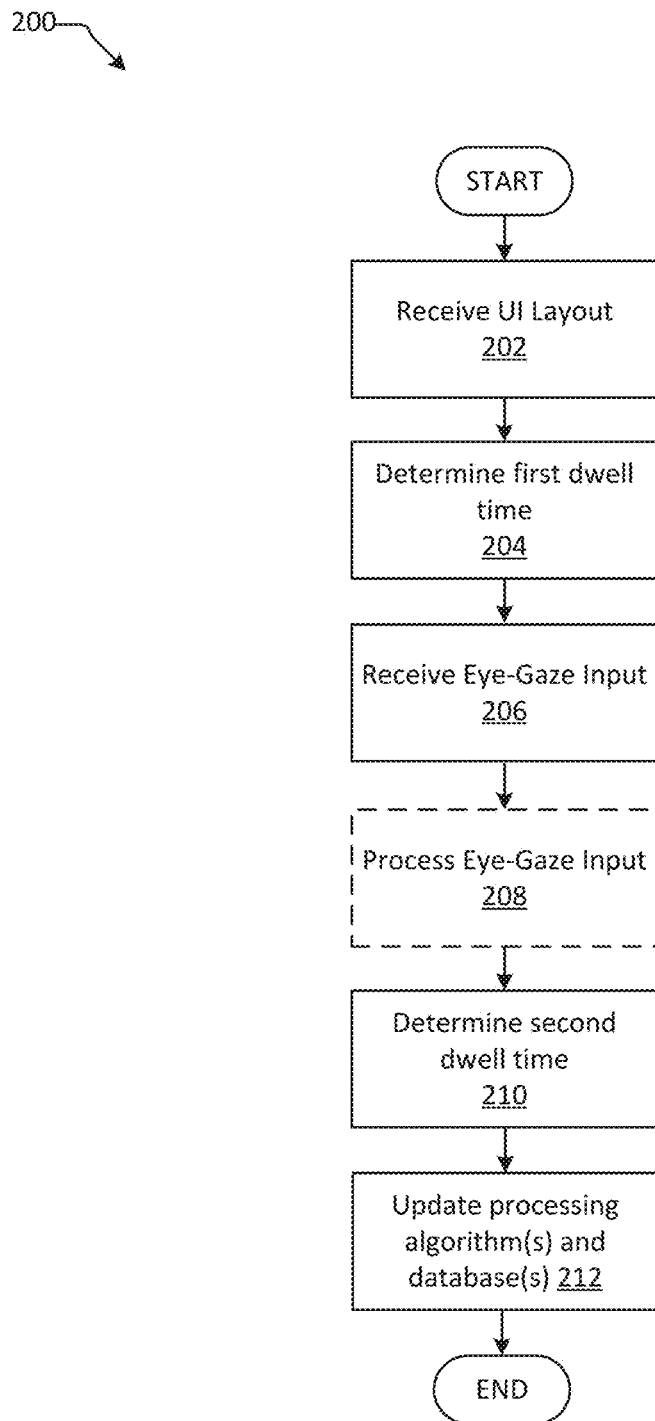
FIG. 2 is a block diagram illustrating a method for dynamically determining dwell times for eye-gaze processing.

FIG. 2 is a block diagram illustrating a method for dynamically determining dwell times for eye-gaze processing.

Method 200 may begin with receive UI layout operation 202. The UI layout may be received based on a real-time analysis of the user interface and/or based on layout information provided by the user interface (e.g., based on metadata). The user interface layout may include one or more UI elements, including but not limited to one or more virtual keys of a virtual keyboard, one or more controls (e.g., buttons, check boxes, function keys, special keys, etc.), one or more input fields (e.g., for receiving a query), and the like. At operation 202, method 200 may receive various information regarding the UI layout, including but not limited to the location of UI elements and the associated functions for UI elements. In aspects, as detailed further below, UI elements associated with more consequential functions or actions may receive longer dwell-times than UI elements associated with less consequential functions or actions. Examples of more consequential functions include but are not limited to closing an application, deleting a word or paragraph, navigating to a different webpage, adjusting settings, and the like. Examples of less consequential functions include but are not limited to typing a single character using a virtual keyboard, selecting a backspace or a spacebar, and the like. Additionally, in some cases, method 200 may rely on eye-tracker hardware that can record a plurality of gaze locations in a matter of milliseconds. In some cases, historical eye-gaze input and UI layout data may be sent to the dynamic dwell-time system disclosed herein for processing and analysis. The historical eye-gaze input and the UI layout data may be detected and received by the dynamic dwell-time system at operation 202.

At first determine operation 204, a first dwell time may be determined. For example, considering the locations of each UI element within the UI layout, and the respective functions for each UI element, method 200 may determine a first dwell time for each of the respective UI elements. For example, if a user was interfacing with a virtual keyboard but had not yet input any text, the dynamic dwell-time system may establish a shorter, yet consistent, dynamic dwell-time across each character key of the virtual keyboard. If a user then proceeds to type the letter "Q," for example, then the dynamic dwell-times of each of the character keys may be adjusted according to an analysis by the dwell-time processor (e.g., dwell-time processor 300 of FIG. 3). The dynamic dwell-time system may adjust the dwell-times for one or more character keys on a virtual keyboard, in this case. For example, the character key "u" may be assigned a shorter dwell time, since it is often a letter following "q," while the character key "z" may be assigned a longer dwell time, since it rarely follows "q." In this way, the dynamic dwell-time system may ensure that a user gazes at certain unlikely letters for an extended time before recognizing a selection of such letters.

In some example aspects, the first dwell time of the character elements may be pre-programmed. This may occur in a new system without historical user data. It may also occur in cases where the user has manually configured the dwell times, rather than allowing the machine-learning algorithms to dynamically adjust the dwell-times of each UI element within a user interface.

At receive input operation 206, eye-gaze input may be received. In some cases, the eye-gaze input of receive input operation 206 may consist of eye-typing, where the eye-gaze input corresponds to selection of one or more UI elements (e.g., one or more character keys within a virtual keyboard) so as to type one or more words (e.g., in a messaging application, a search engine, or other word processing application or feature). In other example aspects, the eye-gaze input may consist of a selection of a UI element such as a control button, navigation bar, dropdown menu, and the like. For example, the user may desire to scroll down a webpage. Eye-gaze input associated with a navigation bar may be received by the dynamic dwell-time system, and dwell-times for the subsequently exposed UI elements at the bottom of the webpage may be automatically adjusted in response to the navigation input (e.g., scrolling) from the user. In other example aspects, a user may wish to navigate to a different webpage by gazing at a hyperlink within the webpage. Any such input may be received at receive input operation 206.

The eye-gaze input may comprise different types of data, including, but not limited to, pixel coordinates for each gaze location and the fixation time (e.g., gaze time) associated with each gaze location. The fixation time may refer to a length of time a user gazes at a certain section of the UI layout. This may be calculated based on identifying a cluster of gaze locations associated with the same or similar location within the user interface.

At optional process operation 208, the eye-gaze input may be processed. In some example aspects, the dynamic dwell times may be manually configured by the user at various times; thereby subverting the process operation 208. In other example aspects, the dynamic dwell times may be configured automatically by a dwell-time processor, such as dwell-time processor 300 of FIG. 3. The dwell-time processor may receive the eye-gaze input, the UI layout data, current dwell-times for the UI elements displayed within the user interface, historical user-specific eye-gaze information, historical click-log data, and/or any other appropriate information. The dwell-time processor may then proceed to detect selections of various UI elements based on the received eye-gaze input, the UI layout (or based on determining the UI layout using a layout detection engine), and/or any other received input. For instance, processing the eye-gaze input may comprise identifying a shape of an eye-gaze path (e.g., a series of gaze locations traversing the user interface) using a shape detection engine. Alternatively, the eye-gaze input may be associated with a particular location within the user interface (e.g., associated with a cluster of gaze locations received over a period of time). The UI layout, the eye-gaze path shape and/or the eye-gaze location may then be sent to a feature extraction engine associated with the dwell-time processor, where the eye-gaze input may be compared against lexical and contextual features that are stored in local and/or remote databases. The comparison data may then be sent to a semantic determination engine to determine an intended meaning of the eye-gaze input. For example, when a user is interfacing with a virtual keyboard, this may consist of determining a predicted word or character that the user intends to input. The semantic determination engine may refer to message context and historical typing patterns, as well as statistical models of word n-grams, to determine a semantic meaning of the eye-gaze input. The semantic meaning of the eye-gaze input may be used by the dwell-time processor to determine and suggest a predicted word or character to the user.

In further example aspects, the semantic determination engine may determine an intended action of the user by analyzing the shape of a user's eye-gaze path on a screen. For example, a user may gaze from the middle of the screen on a webpage to the top-right corner of the user interface to select a button located in the vicinity of the right corner of the user interface. Additionally, the semantic determination engine may consider previous actions that the user took on the webpage to more intelligently determine the intended action of the user. This may be helpful when a plurality of buttons are located in the top-right corner of the screen, and the dynamic dwell-time system must determine which button is the most appropriate to activate according to the context of the user's actions within the user interface.

At second determine operation 210, the processed data may be sent to a dwell-time handler engine that triggers an action by the dynamic dwell-time system and subsequently recalculates and dynamically reconfigures the dwell times (e.g., by determining second dwell times) for one or more of the UI elements on the screen. For example, when a user is typing on a virtual keyboard, each character that is input may trigger a reconfiguration of dwell times for one or more other characters (or the same character). In other example aspects, one or more character keys may be hard configured with a single default dwell time, which may not be reconfigured in response to the eye-gaze input. In further example aspects, a user may be interfacing with a webpage and the received eye-gaze input may be determined to select a navigation control (e.g., a hyperlink) that redirects the user to a different webpage. After redirecting to the different webpage, the dynamic dwell-time system may receive the UI layout and assign intelligent dwell times to each UI element within the user interface associated with the different webpage.

In further aspects, where the user does not navigate to a different webpage but some other function has been performed in response to the eye-gaze input, the dynamic dwell-time system may determine a second dwell time to assign to one or more UI elements in the user interface. The second dwell time may be the same as the first dwell time in some example aspects. For example, regarding a virtual keyboard, the critical key that closes the program may have a consistent, longer dwell-time regardless of the eye-gaze input. In other example aspects, the close program key may be reconfigured to have a slightly shorter second dwell time when the dynamic dwell-time system determines that the user is almost finished typing in a document or message, when the function performed was a save function, and the like.

In one example aspect, the dynamic dwell-time system may be configured to communicate with third-party applications to further determine dwell times. For example, a user may have a scheduled forthcoming calendar event. The dynamic dwell-time system may be configured to receive traffic updates from a third party map application and may communicate with a calendar application of the user. As a result, when the system determines that it is time to leave for the appointment, the dynamic dwell-time system may assign a shorter-than-normal second dwell time to the save and close buttons within the user interface. In this way, the user may not need to gaze for long periods of time to select such controls while rushing to leave for the scheduled appointment.

At update operation 212, the eye-gaze input, the UI layout data, the first dwell time, the second dwell time and/or any other information gleaned from the processing of the input may be stored in at least one database that may be accessed by the machine-learning algorithms utilized by the dwell-time processor. The storing of this data may occur at update operation 212, and this historical data may be referenced in the future to more intelligently determine the dwell times of UI elements. The user-specific data may be used to tailor the dynamic dwell-time system specifically to the user's behaviors and preferences. Regardless of whether the previous dwell times were automatically configured by the dwell-time processor or manually configured, the eye-gaze input, UI layout data, and dwell times may still be stored at update operation 212 for future use by the dwell-time processor and its associated machine-learning algorithm(s).

As should be appreciated, the various methods, devices, components, etc., described with respect to FIG. 2 are not intended to limit method 200 to being performed by the particular components described. Accordingly, additional topology configurations may be used to practice the methods and systems herein and/or components described may be excluded without departing from the methods and systems disclosed herein.

Figure 3:
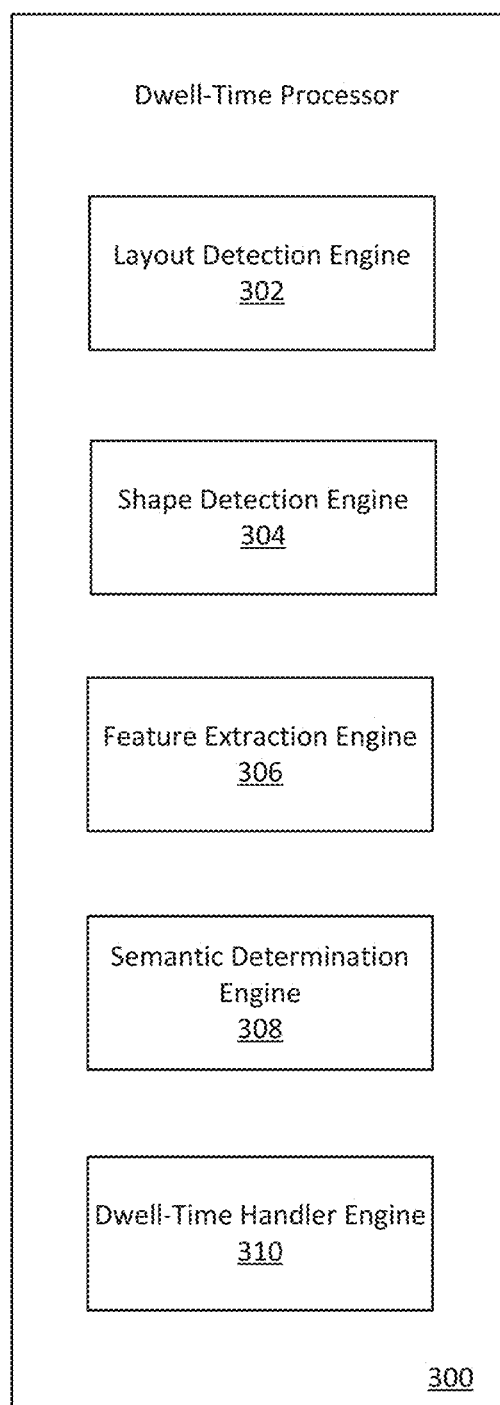
FIG. 3 is a block diagram illustrating a dwell-time processor.

FIG. 3 is a block diagram illustrating a dwell-time processor.

Dwell-time processor 300 may be configured to receive eye-gaze input data and user interface (UI) layout data. For example, dwell-time processor 300 may be configured to receive eye-gaze locations that are associated with specific character keys on a virtual keyboard. In other example aspects, dwell-time processor 300 may be configured to receive eye-gaze locations that are associated with web browser UI elements or UI elements within a toolbar or other control field of an application UI, and the like.

Upon receiving eye-gaze locations and UI layout data, dwell-time processor 300 may send this data to the layout detection engine 302. The layout detection engine 302 may be configured to analyze the layout of the user interface. The analysis by layout detection engine 302 may comprise detecting the location of certain UI elements in relation to the eye-gaze input, as well as the functions associated with those UI elements. For example, layout detection engine 302 may detect that a certain UI element on a webpage may cause the user to redirect to a different webpage.

Dwell-time processor 300 may also utilize shape detection engine 304 to determine the shape of the eye-gaze input. The "shape" of the eye-gaze input may refer to the eye-gaze path that is tracked by the eye-tracker hardware device. The gaze path may comprise a series of gaze locations (e.g., pixel coordinates). The shape detection engine 304 may receive the series of gaze locations and detect the gaze path that was traced. The shape detection engine 304 may also consider nearby UI elements that received gaze locations, as well as those UI elements that did not receive gaze locations. After analyzing the UI layout characteristics using layout detection engine 302 and analyzing a shape of the eye-gaze input using shape detection engine 304, the data may be sent to feature extraction engine 306 for further processing.

Feature extraction engine 306 may be configured to analyze the various tokens in conjunction with both lexical features and contextual features. The feature extraction engine 306 may be configured to communicate with local and remote databases that store lexical features, such as a dictionary of common word n-grams. These n-grams may be compared against the various tokens (e.g., characters or sequences of characters) determined from the eye-gaze input. Regarding contextual features, the feature extraction engine 306 may be configured to communicate with multiple databases that have stored historical data, such as historical user-specific typing patterns, community-wide typing patterns, message history, social media profiles, and other relevant information. For example, in an electronic mail application, a contextual feature database may store a certain message chain. If a user is replying to that stored message chain, the feature extraction engine 306 may reference that contextual feature database with the stored message chain to determine the proper context of the message and ultimately aid dwell-time processor 300 in assigning the appropriate dwell times to various UI elements.

In some example aspects, feature extraction engine 306 may be used in scenarios not involving a virtual keyboard. For example, an eye-gaze input on a webpage may indicate that the user is intending to select a UI element (e.g., button) at the bottom of a page. Because the feature extraction engine 306 is configured to communicate with local and/or remote databases that store historical user data, the feature extraction engine 306 may retrieve historical user data related specifically to the webpage, analyze past user actions on the webpage (e.g., buttons that were selected in the past at the bottom of this webpage), and determine which UI elements at the bottom of the webpage may deserve a longer or shorter dwell time than other UI elements. After the feature extraction engine 306 compares the eye-gaze locations (e.g., an eye-gaze path) and the UI layout data with contextual data and lexical data, the comparison results may be sent to the semantic determination engine 308.

The semantic determination engine 308 may be configured to receive all of the previous processing data of the eye-gaze input and the UI layout data, as well as communicate with local and remote databases that may include statistical models. Semantic determination engine 308 may determine the intended meaning of the user's actions. In the example of a virtual keyboard, the semantic determination engine 308 may consider a set of possible suggested words that will likely come next, according to the gaze locations and associated character keys. The set of suggested words can be utilized by the dwell-time processor to dynamically assign dwell times to certain character keys. A mentioned previously, a user typing a word that begins with "q" may find that the character key "u" has a shorter dwell time than the character key "z" because the character key "u" is more likely to follow the character key "q" than the character "z." This determination may be confirmed during consideration of the set of suggested words. Not only may semantic determination engine 308 consider words and characters, but semantic determination engine 308 may also consider user actions on webpages and within application user interfaces that do not directly involve a virtual keyboard. For example, a user playing a third-party game application may find that the in-game controls have considerably shorter dwell-times than the save-and-quit button at the bottom of the screen. The semantic determination engine 308 may rely on contextual information (e.g., user is playing a game and gazing at the in-game controls) and statistical models (e.g., the historical gaze locations within this game application) to statistically indicate that the user intends to initiate a specific control.

In other example aspects, the semantic determination engine 308 may be configured to consider the application in use, the previous message context and substance in a word processing application, the GPS location of the user (and possibly the intended recipient of a message), and other pertinent data. The semantic determination engine 308 may assess all of this data and determine the semantic meaning of the subsequent word, and/or the intended action of the user according to the user's gaze path. For example, the semantic determination engine 308 may determine a semantic meaning associated with the UI layout data and eye-gaze path and the semantic meaning may then be used to dynamically assign new dwell times to the UI elements on the screen.

After a semantic meaning is assigned to the combined eye-gaze input data and UI layout data, the dwell-time handler engine 310 may assign new dwell times to one or more UI elements in the user interface. The UI elements may consist of individual character keys on a virtual keyboard, the UI elements may consist of action buttons within a webpage or third-party applications, and the like. For example, if it has been determined from the context of a message and a recent word selection (e.g., "chao") that the user is likely to send a message, the dwell time for a send control may be dynamically reconfigured with new shorter dwell time. In other example aspects, e.g., for UI elements with manual or hard-coded dwell times, these "new" dwell times may remain unchanged from the previous dwell times.

As should be appreciated, the various methods, devices, components, etc., described with respect to FIG. 3 are not intended to limit dwell-time processor 300 to being performed by the particular components described. Accordingly, additional topology configurations may be used to practice the methods and systems herein and/or components described may be excluded without departing from the methods and systems disclosed herein.

Figure 4A:
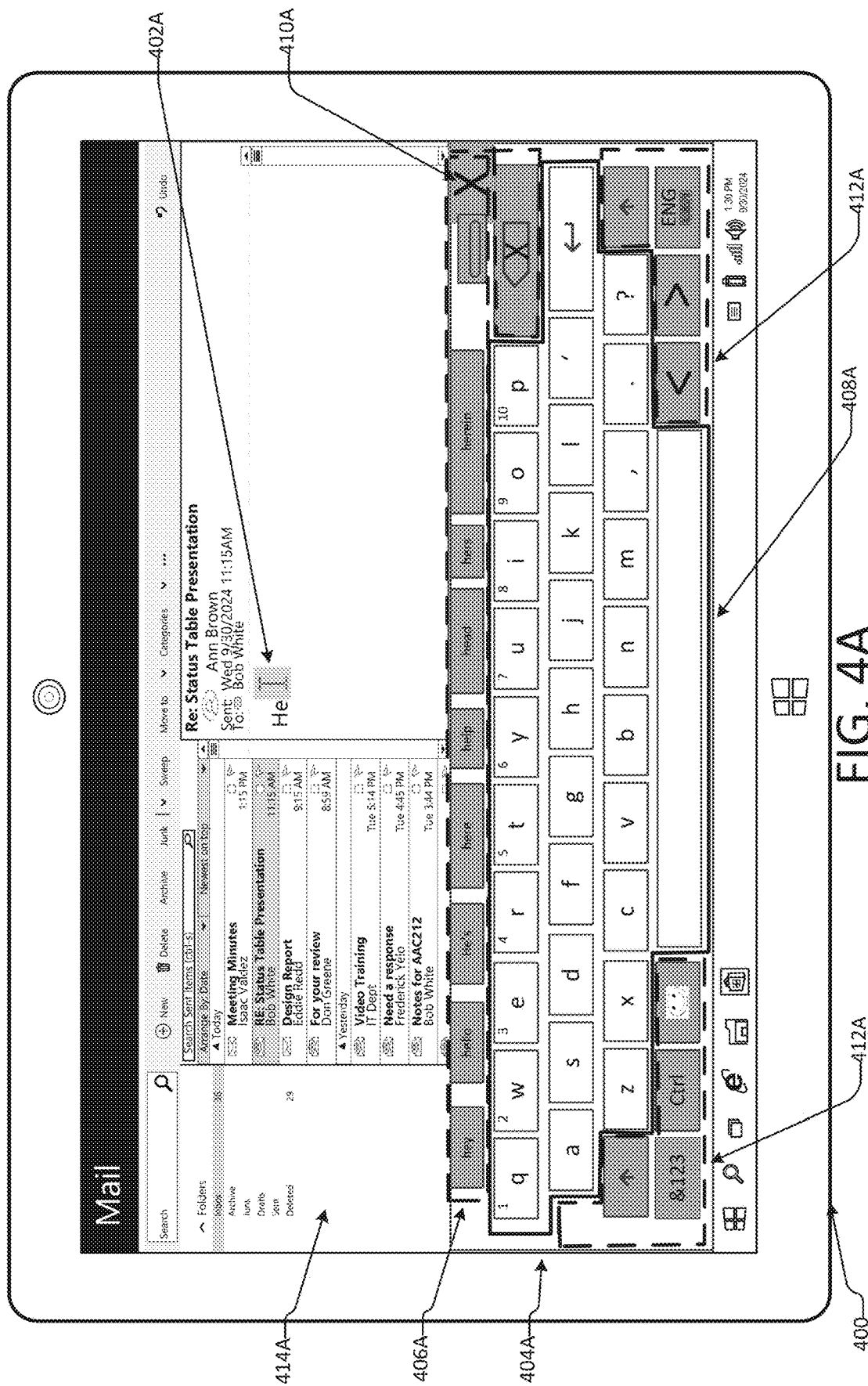
FIG. 4A illustrates an example of dynamic dwell-times as applied to sets of keys on a virtual keyboard.

FIG. 4A illustrates an example of dynamic dwell-times as applied to sets of keys on a virtual keyboard.

In some example aspects, the dynamic dwell-time system may assign a consistent dwell time to a set of character keys on a virtual keyboard. For example, device 400 may be running an electronic mail application, virtual keyboard 404A may be displayed within a user interface 414A, and cursor location 402A may indicate a position within a message for the user's next input. Area 408A is designated by a solid black line and contains the basic character keys in addition to the return key and the spacebar for the virtual keyboard 404A. Area 408A may be associated with a first dwell time. Suggested word area 406A and critical area 412A are denoted by dashed lines. These areas 406A and 412A may be associated with a second dwell time that is different from the first dwell time associated with the keys located within area 408A. The keys within area 408A are primarily character keys that may have little consequential impact if selected (e.g., the typing of a single character). As such, the keys located within area 408A may have shorter dwell times than the keys located within areas 406A and 412A. That is, the first dwell time may be shorter than the second dwell time. Furthermore, close program button 410A is located within an area designated by another dashed line. This may indicate that the close program button 410A may have a longer dwell time (e.g., third dwell time) than the character keys located in area 408A or the more critical keys located in areas 406A and 412A. In some cases, the close program button 410A may be associated with the same dwell time (e.g., second dwell time) as the more critical keys located in areas 406A and 412A.

In some example aspects, visual cue (e.g., visual aid) may be provided to the user to indicate the relative length of dwell times for sets of characters, as well as when a certain key is about to reach its threshold dwell time and activate. For example, the outlines of areas 408A, 406A, and 412A may appear as visible outlines on a virtual keyboard, indicating to the user that certain keys have shorter and longer dwell times. In further example aspects, when a user fixates on a certain UI element, the UI element may become animated to indicate to the user that the UI element is about to reach its dwell time and activate. In one example, the UI element may change color, brightness or opacity to indicate that it is about to reach its dwell time.

The dwell times for certain sets of keys may be dynamically and automatically modified by the dwell-time system disclosed herein. In other example aspects, the times for certain sets of keys may be manually configured or hard-coded. For example, a user may preconfigure the dwell time for the characters in area 408A, as well as the characters in areas 406A and 412A, but a dwell time for the close program button 410A may be hard-coded. In other examples, the user may manually configure the dwell time for any area of the user interface, or the dynamic dwell-time system may automatically configure and/or dynamically reconfigure any area of the user interface as determined appropriate by the dwell-time system. Other examples are possible and the disclosed examples should not be considered limiting.

Figure 4B:
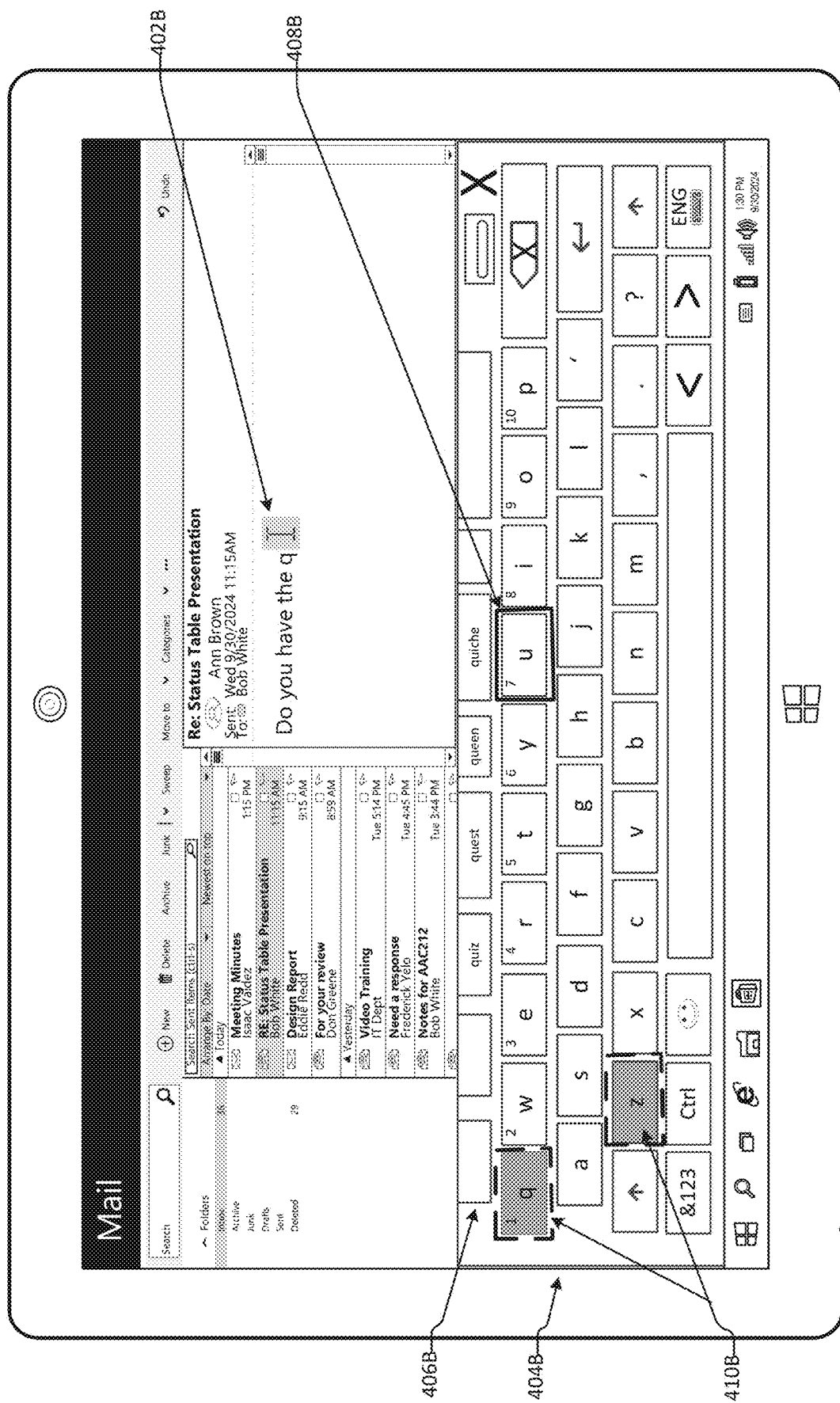
FIG. 4B illustrates an example of dynamic dwell-times as applied to individual keys on a virtual keyboard.

FIG. 4B illustrates an example of dynamic dwell-times as applied to individual keys on a virtual keyboard.

Rather than configure dwell times according to sets of keys (e.g., areas of the keyboard), the dynamic dwell time system disclosed herein may automatically establish dwell times for certain individual characters according to contextual data. For example, device 400 is running an electronic mail application. The user may be intending to type a word that starts with "q" at cursor location 402B. As a result, the dynamic dwell-time system may assign a different dwell-time for the letters "q" and "z," as denoted by a dashed box 410B. As previously described in FIG. 3, the dynamic dwell-time system may utilize a dwell-time processor that is configured to communicate with local and/or remote databases that may comprise statistical models. Statistically, a word that begins with the letter "q" is unlikely to be followed by a subsequent "q" or "z" (or other consonant for that matter). As such, those individual character keys may be dynamically reconfigured with longer-than-normal dwell times in response to input of the letter "q," as indicated by the dashed box 410B. By assigning longer dwell times to these individual keys, a user is less likely to unintentionally make an inadvertent typing error. If a user does intend to enter a subsequent "q" after the first "q," then the user may be required to fixate for a longer period of time on the character "q" to reach that character key's assigned dwell time.

Alternatively, the character key "u" statistically follows the character key "q" more frequently than other characters.

As such, in response to input of a letter "q," character key "u" may be dynamically reconfigured with a shorter dwell time as compared to character keys "q" and "z." The shorter dwell time for character key "u" is denoted by the solid line box 408B.

In other example aspects, individual UI element dwell times may be applied to webpage scenarios, local application user interfaces, third-party application interfaces, and the like. For example, certain buttons on a webpage may have more critical weight than other buttons. Critical weight may refer to the level of consequence for selecting the button. For example, the critical weight of the "close" button may be more than the critical weight of the "zoom" button or a scroll control.

Figure 4C:
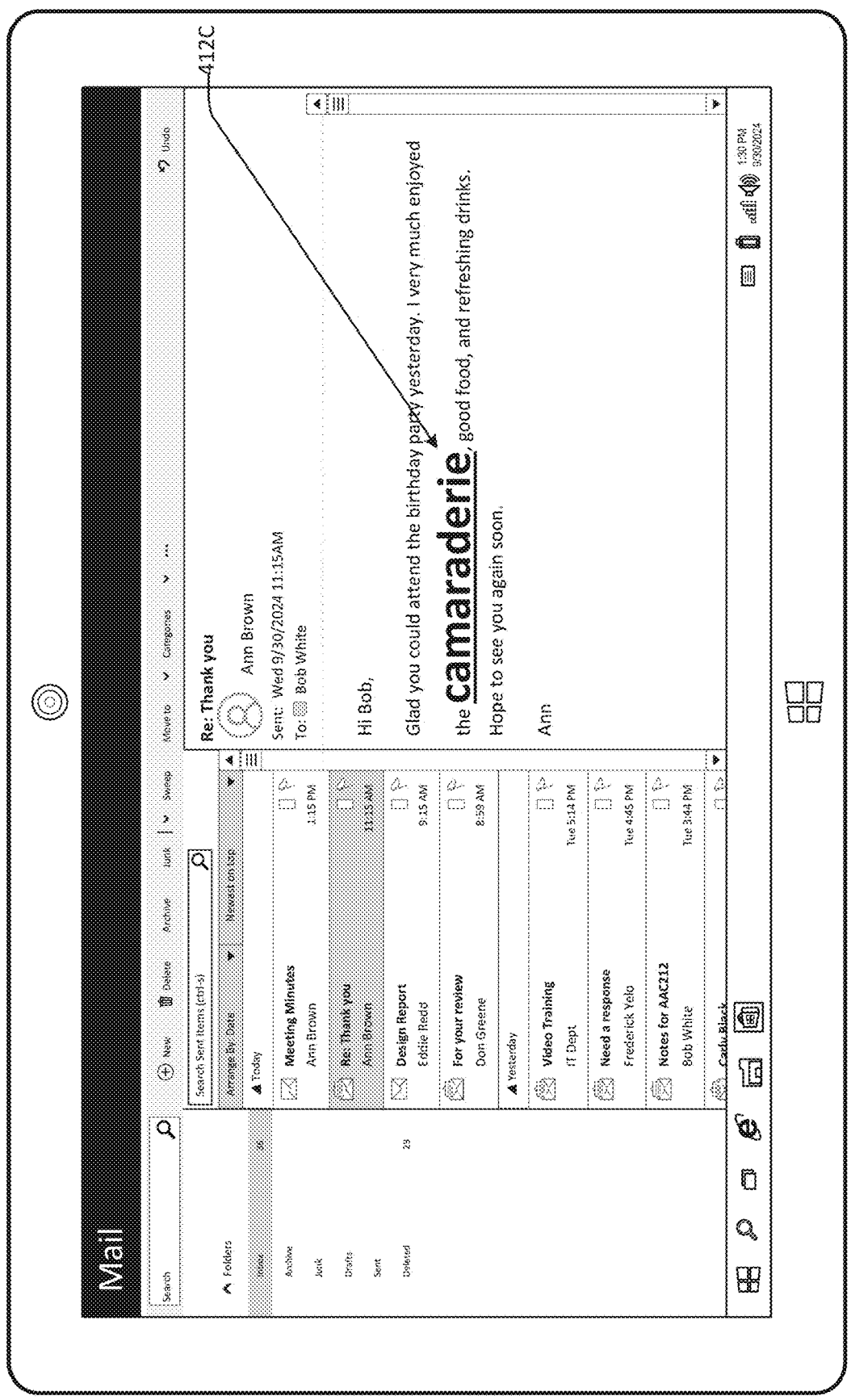
FIG. 4C illustrates an example of dynamic dwell-times as applied to reading text on a screen.

FIG. 4C illustrates an example of dynamic dwell-times as applied to reading text on a screen.

As mentioned previously, the dynamic dwell-time system disclosed herein may not be restricted to only text-input scenarios involving a virtual keyboard. The dynamic dwell-time system may be applied to a variety of scenarios where a user's dwell-time data may be used to trigger a certain beneficial action on the screen. For example, device 400 is running an electronic mail application. As the user is reading the email, the dynamic dwell-time system may notice that the user is spending an abnormally long length of time reading the word "camaraderie." Perhaps the user may not know how to say this word, or perhaps the user may not know the meaning of this word. The dynamic dwell-time system may receive eye-gaze input indicating that the user is spending more time on this word than other words. As such, the dynamic dwell-time system may cause word 412C to be enlarged as compared to the rest of the text (e.g., by zooming or bolding font) to make the word easier to see and read to the user (e.g., by altering contrast or font type). In other example aspects, the dynamic dwell-time system may assign a hyperlink to word 412C, where a pop-up of the definition of the word may appear on the screen within the electronic mail application. In other example aspects, the dynamic dwell-time system may alter the settings of the hardware (e.g., adjust the brightness of the screen) to make word 412C easier to view and read by the user.

As should be appreciated, the various methods, devices, components, etc., described with respect to FIGS. 4A, 4B, and 4C are not intended to limit systems 400 to being performed by the particular components described. Accordingly, additional topology configurations may be used to practice the methods and systems herein and/or components described may be excluded without departing from the methods and systems disclosed herein.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, as described herein.

Figure 5:
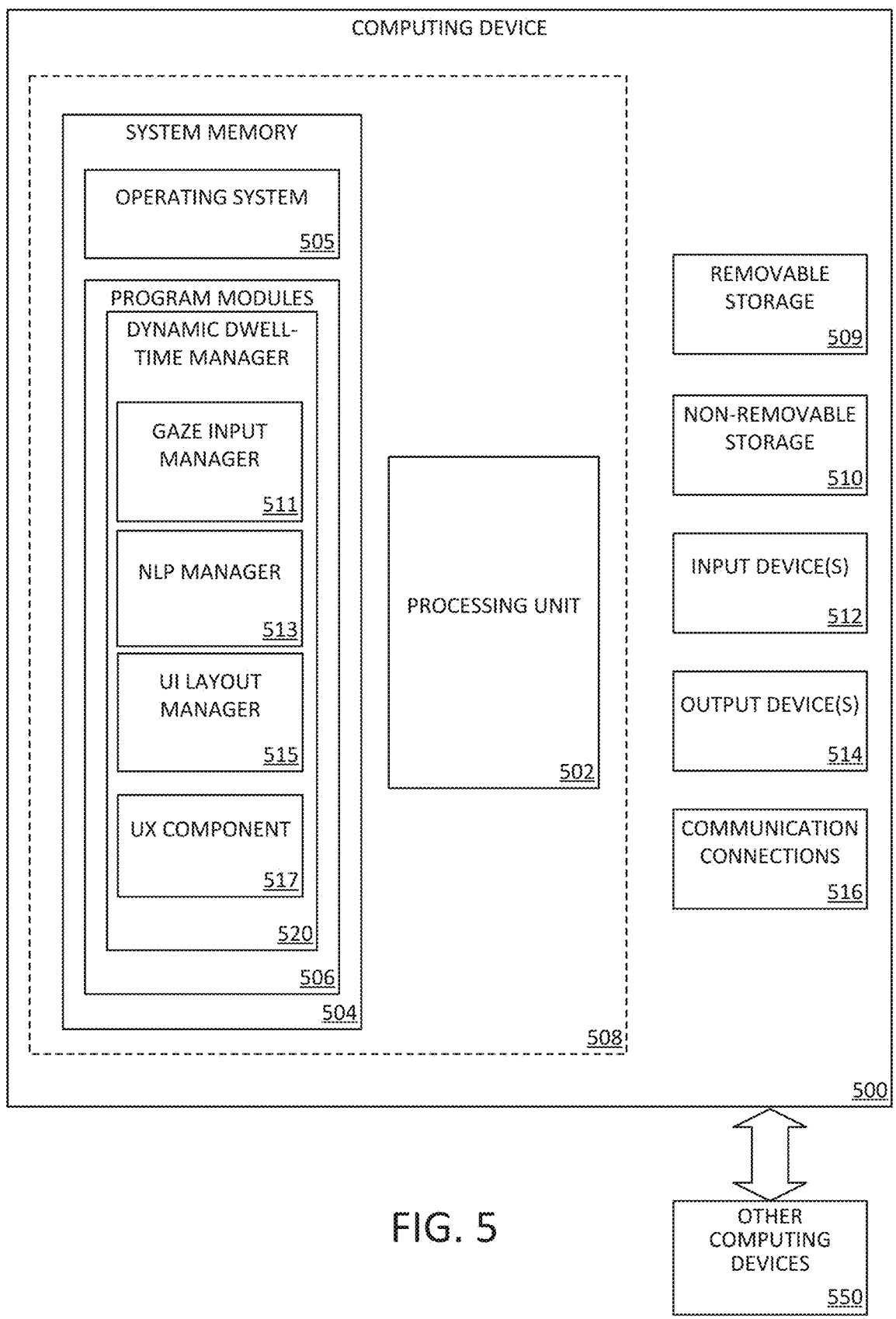
FIG. 5 is a block diagram illustrating example physical components of a computing device with which aspects of the disclosure may be practiced.

FIG. 5 is a block diagram illustrating example physical components (e.g., hardware) of a computing device 500 with which aspects of the disclosure may be practiced. The computing device components described below may have computer-executable instructions for implementing a dynamic dwell-time manager 520 on a computing device (e.g., server computing device and/or client computing device). The computer-executable instructions for a dynamic dwell-time manager 520 can be executed to implement the methods disclosed herein, including a method of dynamically assigning various dwell-times to UI elements according to eye-gaze input and UI layout data. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running a dynamic dwell-time manager 520, such as one or more components with regard to FIGS. 1, 2, 3, 4A, 4B, and 4C, and, in particular, a gaze input manager 511, a Natural Language Processor (NLP) manager 513, a UI Layout Manager 515, and/or UX Component 517.

The operating system 505, for example, may be suitable for controlling the operation of the computing device 500. Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., dynamic dwell-time manager 520) may perform processes including, but not limited to, the aspects, as described herein. Other program modules that may be used in accordance with aspects of the present disclosure, and in particular for dynamically assigning various dwell-times to UI elements according to eye-gaze input and UI layout data, may include a gaze input manager 511, an NLP manager 513, a UI layout manager 515, and/or UX Component 517, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include tangible storage media such as RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such tangible computer storage media may be part of the computing device 500. Computer storage media may be non-transitory media that does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
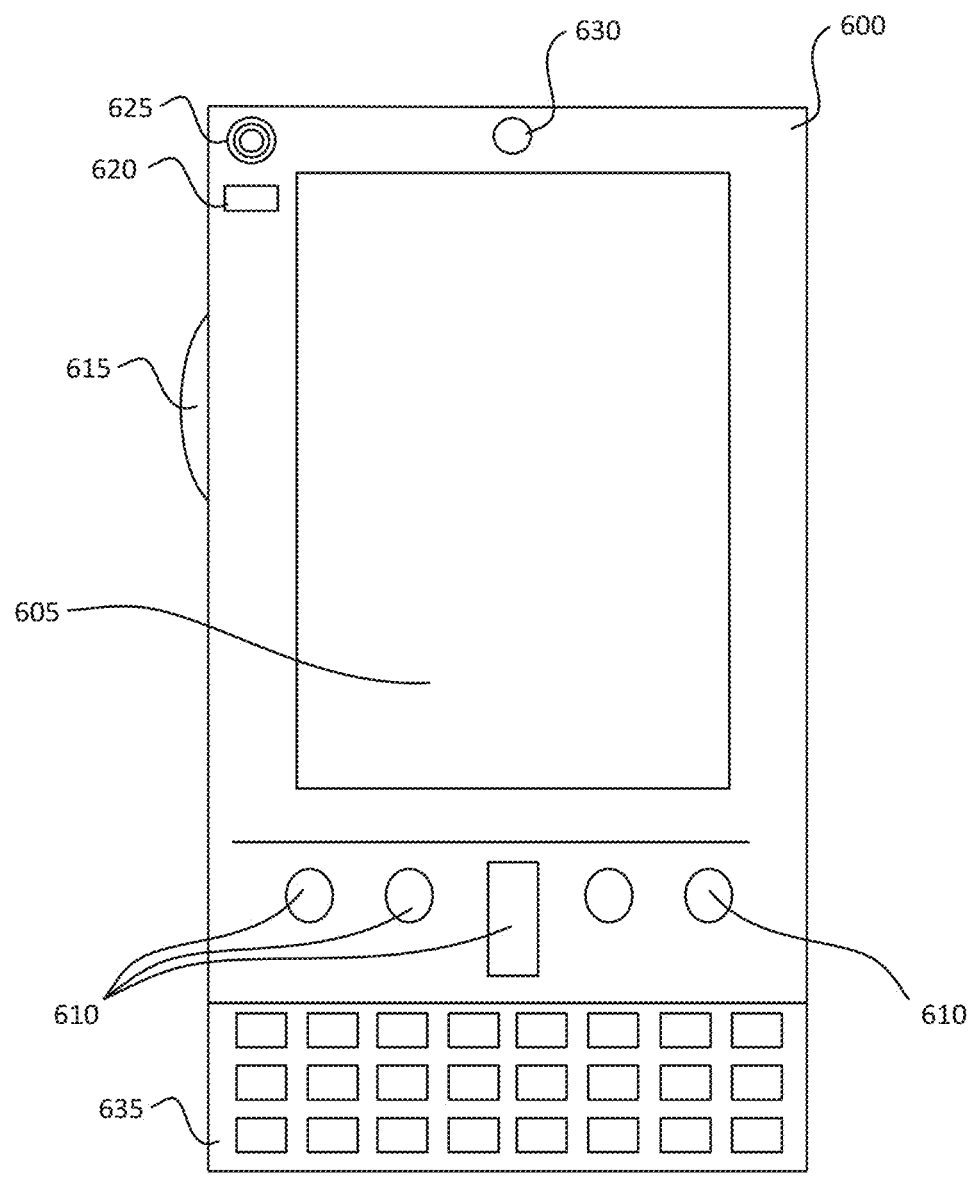
FIGS. 6A and 6B are simplified block diagrams of a mobile computing system in which aspects of the present disclosure may be practiced.
Figure 6B:
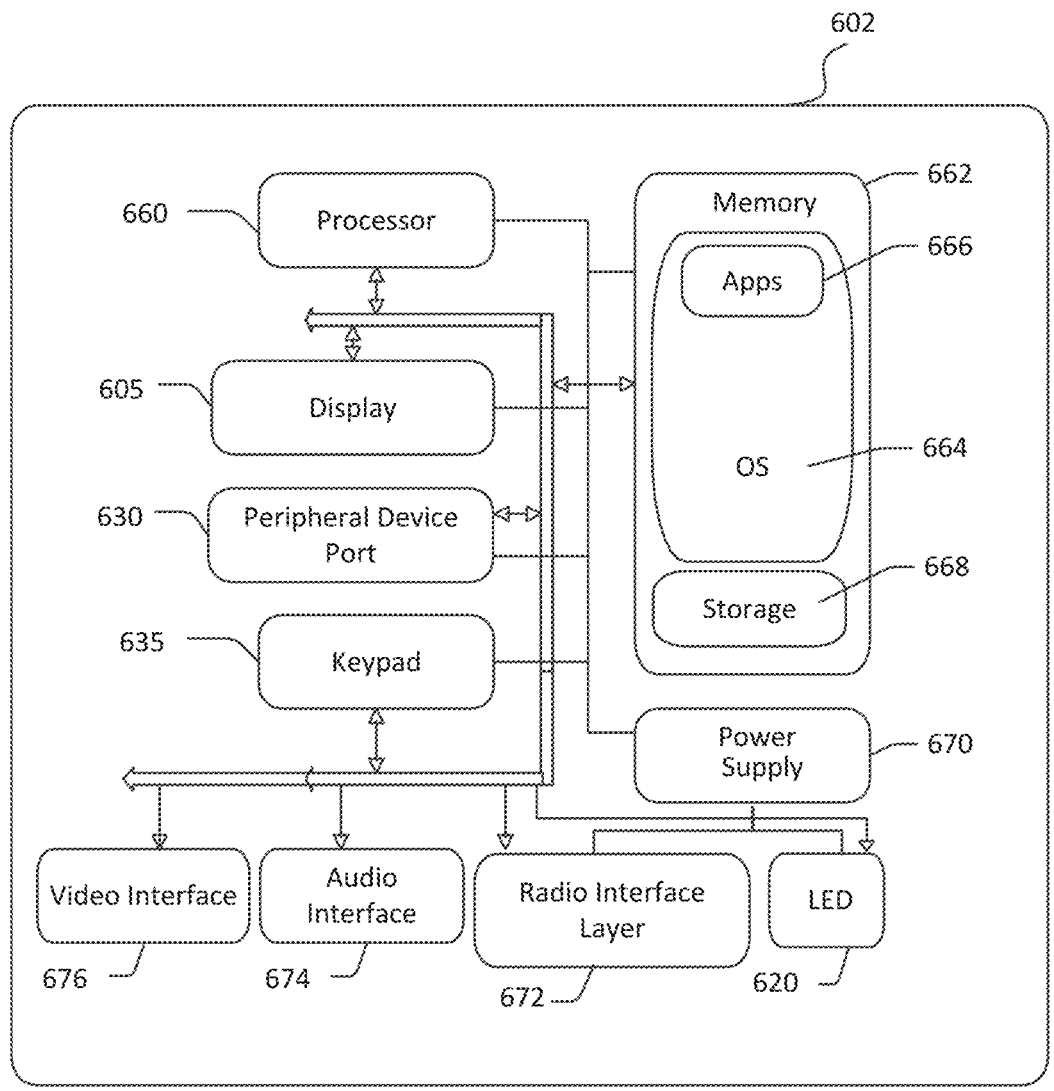

FIGS. 6A and 6B illustrate a mobile computing device 600, for example, a mobile telephone, a smart phone, wearable computer (such as a smart watch or head-mounted display for virtual reality applications), a tablet computer, a laptop computer, and the like, with which embodiments of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as email or other messages used by an email application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600, including the instructions for dynamically assigning various dwell-times to UI elements according to eye-gaze input and UI layout data as described herein (e.g., gaze input manager 511, NLP manager 513, UI layout manager 515, and/or UX Component 517, etc.).

The system 602 has a power supply 670, which may be implemented as one or more batteries. The power supply 670 may further include an external power source, such as an AC adapter or a powered docking cradle that supplements or recharges the batteries. The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via an audio transducer 625 (e.g., audio transducer 625 illustrated in FIG. 6A). In the illustrated embodiment, the visual indicator 620 is a light emitting diode (LED) and the audio transducer 625 may be a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of peripheral device 630 (e.g., on-board camera) to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

As should be appreciated, FIGS. 6A and 6B are described for purposes of illustrating the present methods and systems and are not intended to limit the disclosure to a particular sequence of steps or a particular combination of hardware or software components.

Figure 7:
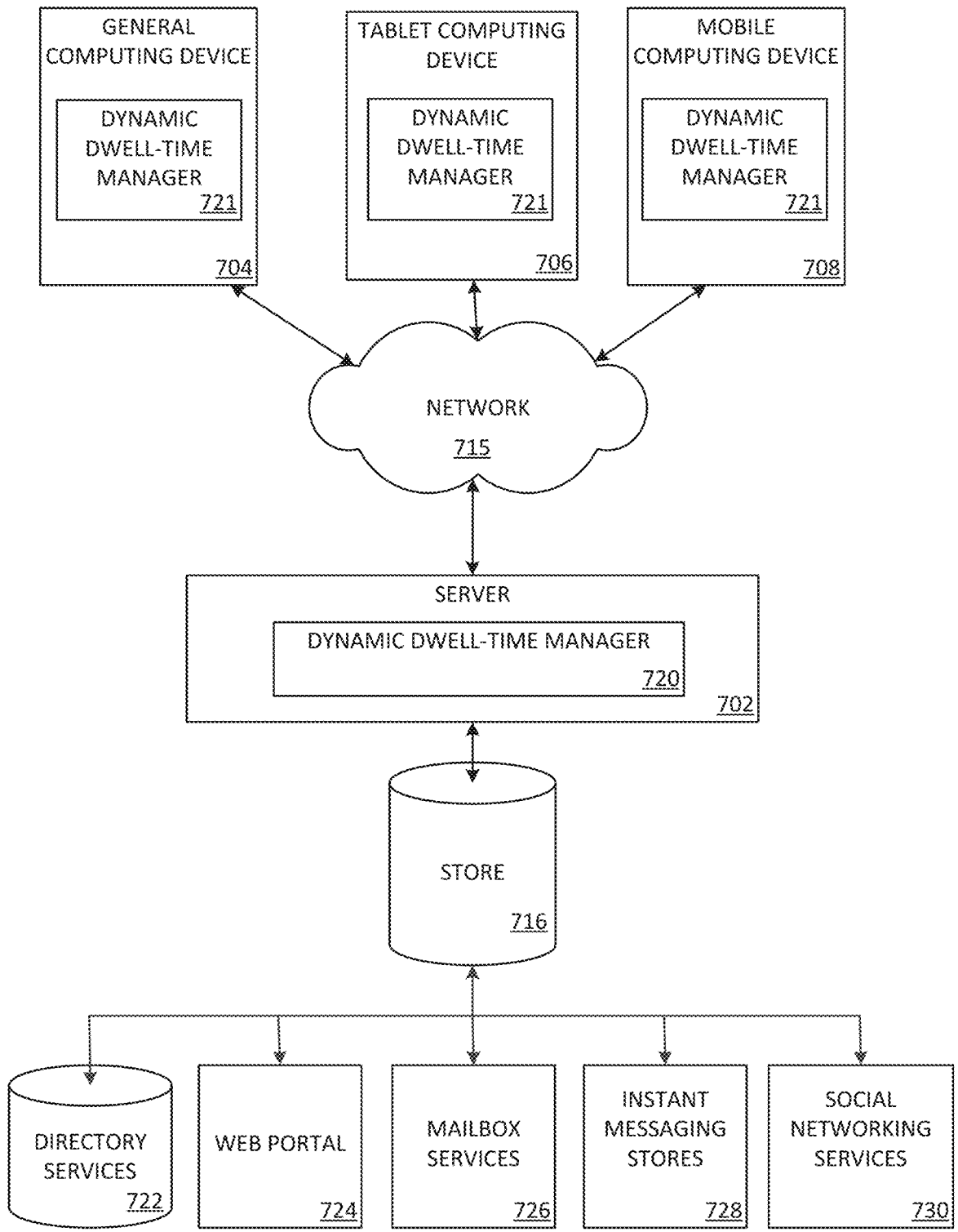
FIG. 7 is a simplified block diagram of a distributed computing system in which aspects of the present disclosure may be practiced.

FIG. 7 illustrates one aspect of the architecture of a system for processing data received at a computing system from a remote source, such as a general computing device 704 (e.g., personal computer), tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking service 730. The dynamic dwell-time manager 721 may be employed by a client that communicates with server device 702, and/or the dynamic dwell-time manager 720 may be employed by server device 702. The server device 702 may provide data to and from a client computing device such as a general computing device 704, a tablet computing device 706 and/or a mobile computing device 708 (e.g., a smart phone) through a network 715. By way of example, the computer system described above with respect to FIGS. 1-6 may be embodied in a general computing device 704 (e.g., personal computer), a tablet computing device 706 and/or a mobile computing device 708 (e.g., a smart phone). Any of these embodiments of the computing devices may obtain content from the store 716, in addition to receiving graphical data useable to either be pre-processed at a graphic-originating system or post-processed at a receiving computing system.

As should be appreciated, FIG. 7 is described for purposes of illustrating the present methods and systems and is not intended to limit the disclosure to a particular sequence of steps or a particular combination of hardware or software components.

Figure 8:
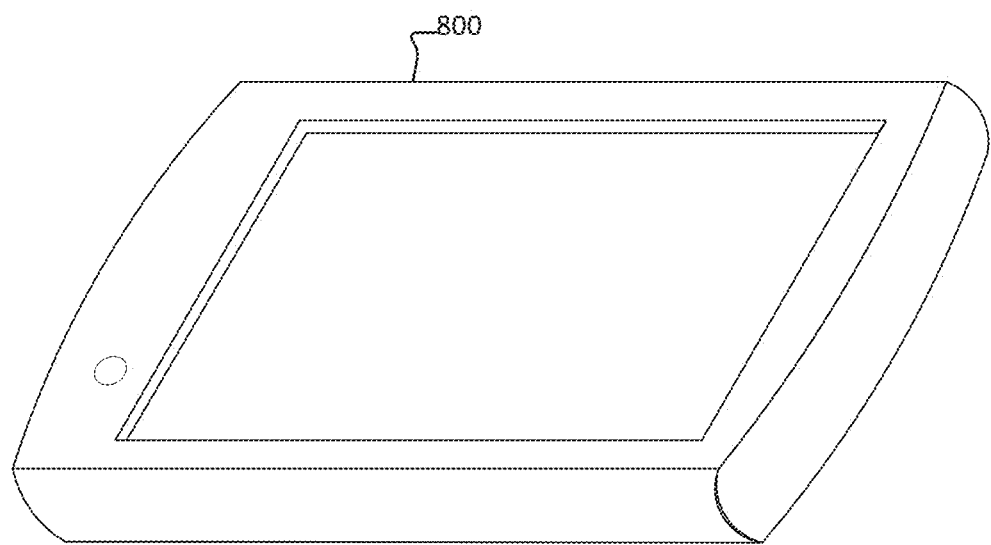
FIG. 8 illustrates a tablet computing device for executing one or more aspects of the present disclosure.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 8 is described for purposes of illustrating the present methods and systems and is not intended to limit the disclosure to a particular sequence of steps or a particular combination of hardware or software components.

The embodiments of the disclosure described herein are implemented as logical steps in one or more computer systems. The logical operations of the present disclosure are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosure. Accordingly, the logical operations making up the embodiments of the disclosure described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the disclosure. Since many embodiments of the disclosure can be made without departing from the spirit and scope of the disclosure, the disclosure resides in the claims hereinafter appended. Furthermore, structural features of the different embodiments may be combined in yet another embodiment without departing from the recited claims.

What is claimed is:

1. A system comprising:
a camera;
a processor; and
memory coupled to the processor, the memory comprising computer executable instructions that, when executed by the processor, performs a method comprising:
causing the camera to capture first eye gaze input that is associated with a first eye gaze location falling in a first area that corresponds to a first UI element of a user interface, wherein the first UI element is associated with a first threshold dwell time;
accessing stored contextual data relating to a frequency of selection of UI elements;
accessing stored contextual data comprising a frequency of selection of UI elements that includes a second UI element of the user interface;
based on the stored contextual data, dynamically setting a second threshold dwell time for the second UI element, wherein dynamically setting the second threshold dwell time includes decreasing the second threshold dwell time from a first value to a second value;
causing the camera to capture second eye gaze input that is associated with a second eye gaze location falling in a second area that corresponds to the second UI element;
determining a dwell time of the second eye gaze input at the second UI element;
determining the dwell time of the second eye gaze input exceeds the second threshold dwell time for the second UI element; and
in response to determining the dwell time of the second eye gaze input exceeds the second threshold dwell time, performing an action associated with the second UI element.

2. The system of claim 1, wherein the method further comprises:
prior to receiving the first eye gaze input:
receiving a layout of the user interface, the layout comprising the first UI element and the second UI element; and
setting the first threshold dwell time for the first UI element.

3. The system of claim 1, wherein the method further comprises:
after receiving the first eye gaze input:
determining a dwell time of the first eye gaze input at the first UI element;
determining the dwell time of the first eye gaze input exceeds the first threshold dwell time for the first UI element; and
in response to determining the dwell time of the first eye gaze input exceeds the first threshold dwell time, performing an action associated with the first UI element.

4. The system of claim 1, wherein the stored contextual data comprises at least one of:
historical user-specific typing patterns; community-wide typing patterns; message history; or social media profiles.

5. The system of claim 1, wherein the stored contextual data indicates a consequential impact of one or more UI elements to the user interface such that UI elements of high consequential impact are assigned higher threshold dwell times than UI elements of low consequential impact.

6. The system of claim 5, wherein the UI elements of high consequential impact comprise at least one of:
a close program control;
a hyperlink; a send control; or
a word suggestion.

7. The system of claim 5, wherein the UI elements of low consequential impact comprise at least one of:
a character key;
a spacebar key; or
a backspace key.

8. The system of claim 1, wherein the stored contextual data comprises at least one of:
historical user data relating to one or more webpages; or
historical user actions on the one or more webpages.

9. The system of claim 1, wherein, prior to receiving the first eye gaze input, the first threshold dwell time and the second threshold dwell time are pre-programmed to a same default value or to respective default values.

10. The system of claim 9, wherein dynamically determining the second threshold dwell time comprises modifying the pre-programmed default value to a dynamically determined value that is different from the pre-programmed default value.

11. The system of claim 1, wherein the second UI element is associated with a first visual cue indicating a length of the second threshold dwell time.

12. The system of claim 11, wherein the second UI element is further associated with a second visual cue indicating that the second UI element has nearly reached the second threshold dwell time.

13. The system of claim 12, wherein the second visual cue comprises at least one of:
an animation;
a change in color;
a change in brightness; or
a change in opacity.

14. A computer-implemented method comprising:
capturing, by a camera, first eye gaze input that is associated with a first eye gaze location falling in a first area that corresponds to a first UI element of a user interface, wherein the first UI element is associated with a first threshold dwell time;
accessing stored contextual data comprising a frequency of selection of UI elements that includes a second UI element of the user interface;
identifying a semantic determination of user intent of the first eye gaze input;
based on the semantic determination of user intent and the stored contextual data, dynamically determining a second threshold dwell time for the second UI element, wherein dynamically determining the second threshold dwell time includes decreasing the second threshold dwell time from a first value to a second value;
capturing, by the camera, second eye gaze input that is associated with a second eye gaze location falling in a second area that corresponds to the second UI element;
determining a dwell time of the second eye gaze input at the second UI element;
determining the dwell time of the second eye gaze input exceeds the second threshold dwell time for the second UI element; and in response to determining the dwell time of the second eye gaze input exceeds the second threshold dwell time, performing an action associated with the second UI element.

15. The method of claim 14, wherein at least one of the first eye gaze input or the second eye gaze input comprises one or more of: pixel coordinates for each eye gaze location and a fixation time for each eye gaze location.

16. The method of claim 14, wherein a statistical model of word n-grams is used to determine the semantic determination of user intent.

17. The method of claim 14, wherein the semantic determination of user intent is used to determine a predicted word or character a user intends to input.

18. The method of claim 14, wherein the semantic determination of user intent is based on at least one of:

a shape of the first eye gaze input, wherein the shape corresponds to an eye gaze path on the user interface; or previous actions of a user within a webpage or a document.

19. A device comprising:

a camera;

a processor; and memory coupled to the processor, the memory comprising computer executable instructions that, when executed by the processor, performs a method comprising:

causing the camera to capture first eye gaze input corresponding to a first UI element of a user interface, wherein the first UI element is associated with a first threshold dwell time;

accessing stored contextual data comprising a frequency of selection of UI elements that includes a second UI element of the user interface;

identifying a semantic determination of user intent of the first eye gaze input;

based on the semantic determination of user intent and the stored contextual data, dynamically determining a second threshold dwell time for the second UI element, wherein dynamically determining the second threshold dwell time includes decreasing the second threshold dwell time from a first value to a second value;

causing the camera to capture second eye gaze input corresponding to the second UI element;

determining a dwell time of the second eye gaze input at the second UI element;

determining the dwell time of the second eye gaze input exceeds the second threshold dwell time for the second UI element; and in response to determining the dwell time of the second eye gaze input exceeds the second threshold dwell time, performing an action associated with the second UI element.

20. The device of claim 19, wherein, prior to receiving the first eye gaze input, the first threshold dwell time and the second threshold dwell time are pre-programmed to a same default value or to respective default values.

* * * * *